US012651235B2

(12) United States Patent
Tsao

(10) Patent No.: US 12,651,235 B2
(45) Date of Patent: Jun. 9, 2026

(54) SYSTEM FOR MONITORING WASTE COLLECTION

(71) Applicant: Commit to Green, New York, NY (US)

(72) Inventor: Shien-Ru Tsao, New York, NY (US)

(73) Assignee: COMMIT TO GREEN, New York, NY (US)

( * ) Notice: Subject to any disclaimer, the term of this patent is extended or adjusted under 35 U.S.C. 154(b) by 688 days.

(21) Appl. No.: 18/059,671

(22) Filed: Nov. 29, 2022

(65) Prior Publication Data

US 2024/0177122 A1    May 30, 2024

(51) Int. Cl.
*G06Q 10/30* (2023.01)
*G01G 19/40* (2006.01)

(52) U.S. Cl.
CPC ............. *G06Q 10/30* (2013.01); *G01G 19/40* (2013.01)

(58) Field of Classification Search
None
See application file for complete search history.

(56) References Cited

U.S. PATENT DOCUMENTS

2023/0206266 A1 * 6/2023 Pearl .................. G06Q 30/0207
705/14.1

* cited by examiner

*Primary Examiner* — Walter L Lindsay, Jr.
*Assistant Examiner* — Geoffrey T Evans
(74) *Attorney, Agent, or Firm* — Sterne, Kessler, Goldstein & Fox P.L.L.C.

(57) ABSTRACT

Disclosed herein are device, method, and system aspects for facilitating the collection of compost from compost producers by compost collectors. An aspect includes a sensor and a computing device. The sensor is configured to determine the weight of an object and store a user identification. The computing device is configured to receive the weight of the object and the user identification from the sensor. The computing device is further configured to retrieve first characteristics corresponding to the user identification and retrieve a list of other user identifications, where each of the other user identifications includes respective second characteristics. The computing device is also configured to order the list of other user identifications based on a degree of similarity between first characteristics of the user identification and second characteristics of each of the other user identifications.

20 Claims, 8 Drawing Sheets

Composting System 100

Server 102

Computing Device 110-2

Waste Collector 114

Container 106

Sensor Unit 104

Waste Producer 112

Computing Device 110-1

Sensor Unit 104

Expansion Ring 500

600

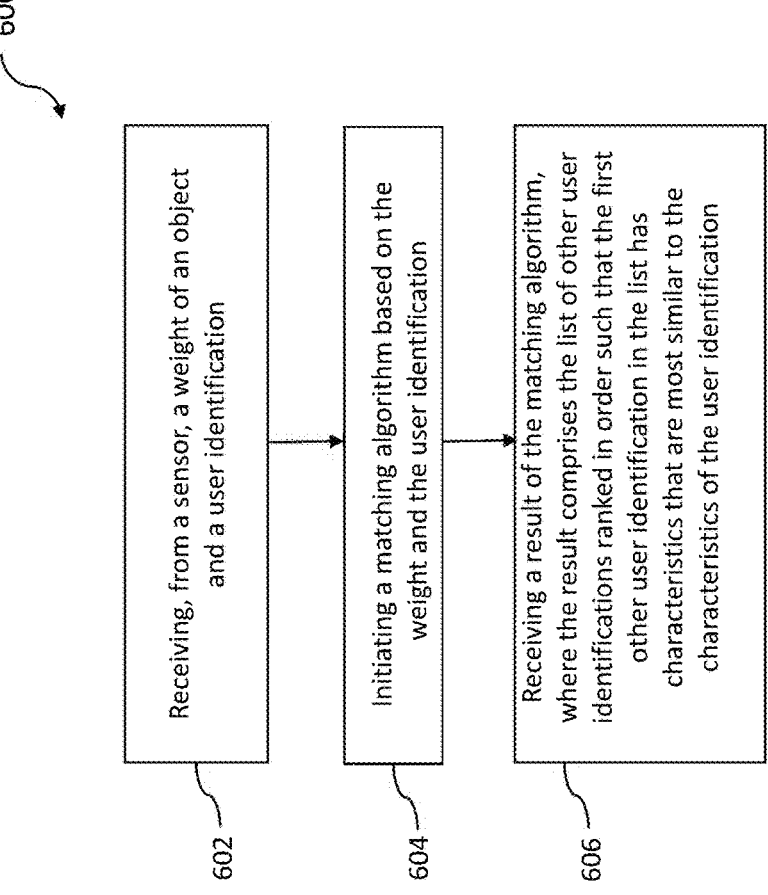

Receiving, from a sensor, a weight of an object and a user identification

602

Initiating a matching algorithm based on the weight and the user identification

604

Receiving a result of the matching algorithm, where the result comprises the list of other user identifications ranked in order such that the first other user identification in the list has characteristics that are most similar to the characteristics of the user identification

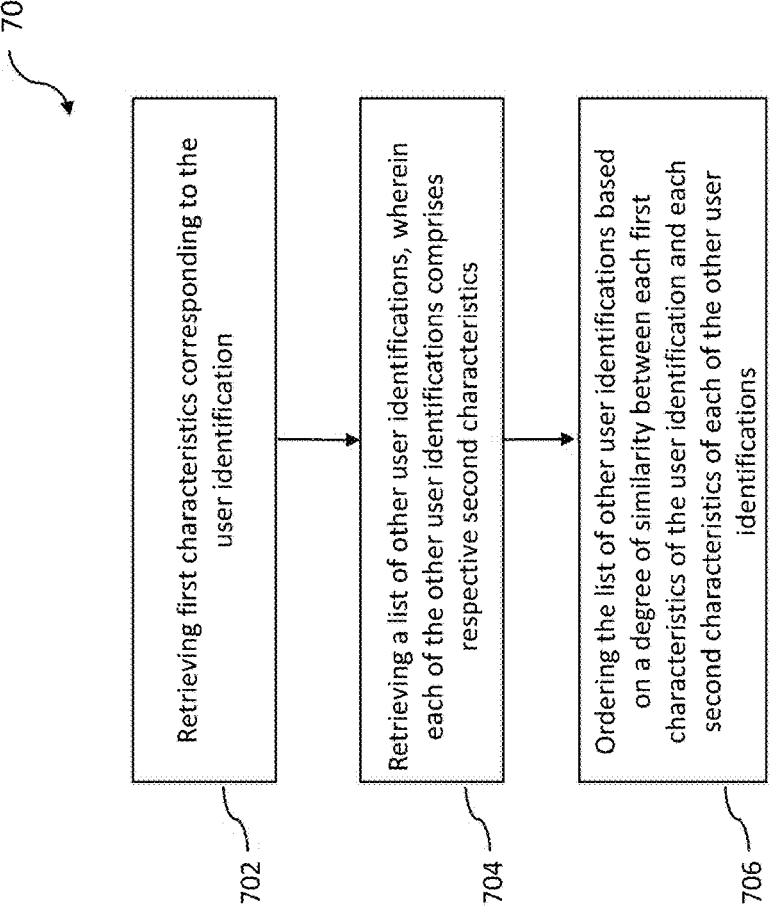

702 Retrieving first characteristics corresponding to the user identification

704 Retrieving a list of other user identifications, wherein each of the other user identifications comprises respective second characteristics 706 Ordering the list of other user identifications based on a degree of similarity between each first characteristics of the user identification and each second characteristics of each of the other user identifications

FIG. 7

SYSTEM FOR MONITORING WASTE COLLECTION

BACKGROUND

Technical Field

Aspects of the present disclosure relate to components, systems, and methods for facilitating compost collection.

Background

Compost or compostable waste is material that can be used as fertilizer when placed into soil. It is commonly generated through the decomposition of plant and food products. Consumers and businesses produce large amounts of compostable waste that is not collected. There are many parties that could benefit from using this compostable waste, such as farmers or garden centers. There is a need in the field to increase the amount of compostable waste that is generated and collected by parties seeking the waste. For example, allowing users to track the amount of compostable waste they produce allows them to view their environmental impact and can incentivize them to continue composting. Additionally, improving the interactions between parties who either need to collect or dispose of compostable material would likely increase the prevalence of composting.

SUMMARY

In aspects presented herein, servers and other computing devices can provide for facilitating the collection of compost from compost producers by compost collectors. In an aspect, an example device for facilitating the collection of compost from compost producers by compost collectors is described. The example device includes a sensor configured to determine a weight of an object and to store a user identification. The example device also includes a computing device. The computing device is configured to receive the weight of the object and the user identification from the sensor, retrieve first characteristics corresponding to the user identification, and retrieve a list of other user identifications, where each of the other user identifications includes respective second characteristics. The computing device is also configured to order the list of other user identifications based on a degree of similarity between first characteristics of the user identification and second characteristics of each of the other user identifications. The degree of similarity between the first and second characteristics can be determined by comparing the value of each of the respective characteristics. An average similarity can be computed from the comparison of each characteristic. For example, characteristics that match may be assigned a "1" and characteristics that do not match may be assigned a "0." The average similarity values can be used to order the list of other user identifications. The computing device is further configured to receive a result from a matching algorithm, where the result includes the list of other user identifications ranked in order such that the first other user identification in the list has characteristics that are most similar to the characteristics of the user identification.

In another aspect, an example method for facilitating the collection of compost from compost producers by compost collectors is described. The method includes receiving, from a sensor, a weight of an object and a user identification. The method also includes initiating a matching algorithm based on the weight and the user identification. The matching algorithm includes retrieving first characteristics corresponding to the user identification, retrieving a list of other user identifications, where each of the other user identifications includes second characteristics. The matching algorithm further includes ordering the list of other user identifications based on a degree of similarity between first characteristics of the user identification and second characteristics of each of the other user identifications. The method receives a result of the matching algorithm, where the result includes the list of other user identifications ranked in order such that the first other user identification in the list has characteristics that are most similar to the characteristics of the user identification.

In another aspect, an example system for facilitating the collection of compost from compost producers by compost collectors is described. The example system includes a container including a surface, at least one wall extending perpendicular to the surface, and a sensor positioned on the surface, where the sensor is configured to determine a weight of an object placed on the sensor and to store a user identification. The system further includes a computing device configured to receive the weight of the object and the user identification from the sensor and initiate a matching algorithm based on the weight value. The matching algorithm is configured to retrieve first characteristics corresponding to the user identification and retrieve a list of other user identifications, where each of the other user identification includes second characteristics. The matching algorithm is further configured to order the list of other user identifications based on a degree of similarity between first characteristics of the user identification and second characteristics of each of the other user identification. The computing device is further configured to receive a result from the matching algorithm, where the result includes the list of other user identifications ranked in order such that the first other user identification in the list has characteristics that are most similar to the characteristics of the user identification and send a message to at least one of the other user identifications, where the message includes a request to collect the object.

Further features and advantages, as well as the structure and operation of various aspects, are described in detail below with reference to the accompanying drawings. It is noted that the specific aspects described herein are not intended to be limiting. Such aspects are presented herein for illustrative purposes only. Additional aspects will be apparent to persons skilled in the relevant art(s) based on the teachings herein.

BRIEF DESCRIPTION OF THE DRAWINGS

The accompanying drawings, which are incorporated herein and form a part of the specification, illustrate aspects of the present disclosure and, together with the description, further serve to explain the principles of the disclosure and to enable a person skilled in the pertinent art to make and use the disclosure.

FIG. 6 is a flowchart of a method for receiving data from a sensor and initiating a matching algorithm, according to some aspects of the present disclosure.

FIG. 7 is a flowchart of a method for executing a matching algorithm, according to some aspects of the present disclosure.

In the drawings, like reference numbers generally indicate identical or similar elements. Additionally, generally, the left-most digit(s) of a reference number identifies the drawing in which the reference number first appears.

Aspects of the present disclosure will be described with reference to the accompanying drawings.

DETAILED DESCRIPTION

Provided herein are apparatus, device, system, method and/or computer-readable medium aspects, and/or combinations and sub-combinations thereof for facilitating the collection of compost from compost producers by compost collectors.

There are at least two technological problems associated with facilitating the collection of compost from compost producers by compost collectors. First, there are currently limited existing solutions to match compost producers with compost collectors in the same locality. This situation results in compost collectors having to expend extra time and resources to seek out compost. Additionally, parties that produce compost end up disposing of it like other types of waste since they may not know of parties willing to collect the compost. Second, there are little to no incentives for users to compost their waste. Again, this results in compostable material being disposed of like other types of waste.

Aspects herein solve these technological problems using an innovative system and method for facilitating the collection of compost from compost producers by compost collectors. For example, the disclosed system allows compost producers to report that they are in possession of compost they wish to have collected. The system can use this information to match the compost producer with a compost collector who wishes to collect the compost. The matched parties can then interact via the system to execute the compost collection. Additionally, the disclosed system implements a reward system to incentivize compost producers based on the amount of compost they have collected.

Figure 1:
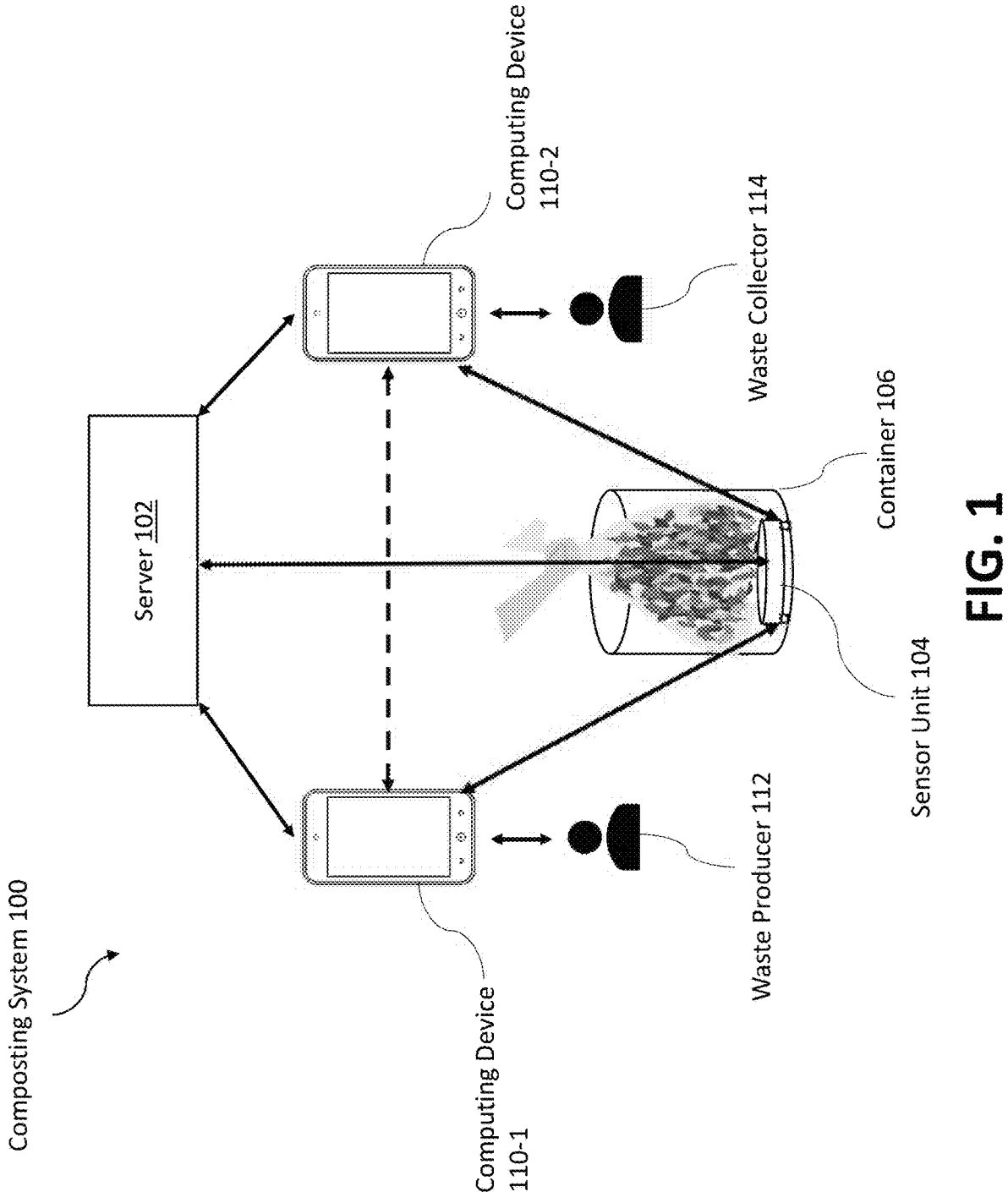
FIG. 1 is an illustration of a system to facilitate the collection of compost from compost producers by compost collectors, according to some aspects of the present disclosure.

FIG. 1 is a diagram of a system 100 for facilitating the collection of compost from compost producers by compost collectors. System 100 can include a server 102, a sensor unit 104, a container 106, computing devices 110-1 and 110-2, a waste producer 112, and a waste collector 114.

Waste producer 112 can be any party that produces waste. Waste producer 112 can be a person, a business, or any other entity as would be appreciated by a person of ordinary skill in the art (POSA). In one embodiment, the waste produced can be compost. For example, a waste producer can be a restaurant that generates compostable material in the form of uneaten food or vegetable scraps. The produced waste can be kept in a bag or other suitable receptacle as would be appreciated by a POSA. For example, the produced waste can be stored in container 106. Waste producer 112 can produce waste in various amounts at various time intervals. Although one waste producer 112 is illustrated in FIG. 1, the disclosure is not limited to that embodiment. Waste producer 112 can place collected waste on a sensor unit 104.

Sensor unit 104 can be a physical object of any size and shape. For example, sensor unit 104 can be round having a width of 12 inches and a height of 2 inches. Sensor unit 104 can have a surface oriented such that waste producer 112 can place waste on top of sensor unit 104. Sensor unit 104 can have a scale. The scale can be capable of determining the weight of an object placed on the surface of sensor unit 104. In one embodiment, the scale can be housed within sensor unit 104. Sensor unit 104 can also store user identification information. The user identification can be used to link sensor unit 104 with waste producer 112. The user identification can be a barcode, a QR code, or any other identifier appreciated by a POSA. Sensor unit 104 can be located within container 106.

Container 106 can be any container capable of housing sensor unit 104. Container 106 can have a bottom surface. The bottom surface can have sufficient surface area for sensor unit 104 to sit flat on the bottom surface. Container 106 can also have walls extending perpendicular to the bottom surface. Container 106 can be constructed from any material, such as plastic, wood, metal, and any other material as would be appreciated by a POSA. In one embodiment, container 106 can be a garbage can.

In one embodiment, container 106 can have a cooling system. The cooling system can prevent the contents of container 106 from spoiling. For example, food waste that will be used for compost can deteriorate faster in a warmer environment than a cooler one. Integrating a cooling system into container 106 can prolong the ability of food waste to be collected from container 106 for composting. In one embodiment, container 106 can have solar panels. The solar panels can be used to power sensor unit 104 and/or a cooling system integrated into container 106.

In one embodiment, sensor unit 104 can be manually placed within container 106. In another embodiment, container 106 can be manufactured with sensor unit 104 built directly into (or integrated with) container 106. This can reduce any potential error associated with a user having to integrate sensor unit 104 into container 106. Container 106 can also have internal dimensions such that an object can be placed inside container 106 on top of sensor unit 104. In one embodiment, the object can be a bag containing compost. In another embodiment, when an object is placed within container 106 and on top of sensor unit 104, sensor unit 104 can initiate communication with computing devices 110-1 and/ or 110-2.

Sensor unit 104 can be preprogrammed to detect when container 106 has reached various levels of capacity. For example, one or more sensor unit 104's can be placed throughout container 106 (e.g., at the bottom, along the sides, at the top, etc.). Sensor unit 104 can be programmed with a volume indicator corresponding to its location within container 106. For example, a sensor unit 104 located halfway along the side of container 106 can have a volume indicator of 50%. A sensor unit 104 placed at the top of container 106, corresponding to its total capacity, can have a volume indicator of 100%. When sensor unit 104 detects an object, it may communicate its programmed volume indicator to computing devices 110-1 and/or 110-2. Therefore, sensor unit 104 with a volume indicator of 100% that detects an object can send a communication to computing devices 110-1 and/or 110-2 that container 106 is full.

Container 106 can also include a camera. The camera can be used to monitor the contents of container 106 and initiate communication with computing devices 110-1 and/or 110-2. For example, the camera can take a photograph and/or video clip each time the contents of container 106 change. The photograph and/or video clip can be sent to computing devices 110-1 and/or 110-2. In another embodiment, the camera can leverage artificial intelligence to detect the type of object within container 106.

The camera can contain an artificial intelligence, machine learning, or other similar system to identify the object in container 106. In other words, the object can be explicitly labeled as such. Label categories can include compostable waste, non-compostable waste, recyclable waste, and non-recyclable waste. The label categories can also include an identification of the object. The machine learning system can include decision trees, k-nearest neighbors, support vector machines (SVM), neural networks (NN), recurrent neural networks (RNN), convolutional neural networks (CNN), probabilistic neural networks (PNN), and/or transformers. RNNs can further include (but are not limited to) fully recurrent networks, Hopfield networks, Boltzmann machines, self-organizing maps, learning vector quantization, simple recurrent networks, echo state networks, long short-term memory networks, bi-directional RNNs, hierarchical RNNs, stochastic neural networks, and/or genetic scale RNNs. In a number of embodiments, a combination of machine classifiers can be utilized, more specific machine classifiers when available, and general machine classifiers at other times can further increase the accuracy of predictions.

Each time the camera captures a photograph or video, the recorded data can be processed by the machine learning system to identify objects within the data. The machine learning system can output a list of the identified objects within the data. The system can also annotate the photograph and/or video to label each identified object within the recorded data. The output of the system can be communicated by the camera to computing devices 110-1 and/or 110-2. As an example, food waste can be placed in container 106, the camera can identify the food waste and communicate this to computing devices 110-1 and/or 110-2. This may be beneficial to ensure that the waste is promptly collected without allowing it to spoil.

In one embodiment, computing devices 110-1 and/or 110-2 can respond to the information sent by the camera. For example, computing devices 110-1 and/or 110-2 can score each label provided by the machine learning system. The score can signify whether the detection was correct and include the correct answer. For example, the machine learning system may have incorrectly labelled a bag of food waste as a bag of yard waste. Computing devices 110-1 and/or 110-2 can receive this information from the camera, and respond by scoring the label as incorrect, and provide the correct label (e.g., food waste). The camera can receive the score from computing devices 110-1 and/or 110-2 and provide it to the machine learning system for training. The machine learning system can use the correctly labelled data to update its object detection model so that future predictions are more accurate.

Computing devices 110-1 and 110-2 can be any combination of hardware and software capable of electronically communicating with sensor unit 104. Computing devices 110 can be a desktop computer, laptop, tablet, smartphone, or other device as would be appreciated by a POSA. Computing devices 110-1 and 110-2 and sensor unit 104 can communicate over a network. The network can be wired, wireless, or a combination thereof. The network can include any combination of local area networks, wide area networks, the internet, or other configuration as would be appreciated by a POSA. Computing devices 110-1 and 110-2 can include a software application to handle communication between computing devices 110-1 and 110-2 and sensor unit 104.

The software application on computing devices 110 can allow a user to create a user profile. The user profile can include information about the user, such as their name, contact information, and address. In one embodiment, the user profile can allow the user to elect if they are a waste producer 112 or a waste collector 114. Waste producers 112 can have the option to input various characteristics about the waste they produce. In one embodiment, the waste produced can be compost. The characteristics can include the type of compost, the amount of compost produced, how frequently they wish the compost to be collected, and where the compost can be collected from. Waste collectors 114 can also input characteristics, such as the types of compost they wish to collect, the amount of compost they are able to collect, the frequency they would like to collect compost, and a location with a corresponding radius defining the region they will collect compost from.

In one embodiment, waste producer 112 has an associated computing device 110-1. Waste producer 112 can link computing device 110-1 with sensor unit 104 via a software application on computing device 110-1. For example, waste producer 112 may own container 106 and sensor unit 104. In this embodiment, waste producer 112 may link computing device 110-1 with sensor unit 104 for future interactions with container 106 and sensor unit 104. In one embodiment, this can be accomplished by exchanging user identification information between computing device 110-1 and sensor unit 104. Although in this example, one computing device 110-1 is linked with one sensor unit 104, in other embodiments multiple computing devices 110-1 can be linked with multiple sensor units 104. For example, container 106 with sensor unit 104 may be located in a public space and not owned by waste producer 112. However, waste producer 112 may still wish to deposit waste into container 106. In this embodiment, waste producer 112 can still link computing device 110-1 with sensor unit 104. Container 106 can be configured to allow or deny waste producer 112's access to container 106 and its accompanying sensor unit 104. For example, container 106 can be password protected. Waste producer 112 can request container 106's password via the software application on computing device 110-1. Container 106's password can be entered via an interface on container 106 or through the software application on computing device 110-1. In another embodiment, the software application on computing device 110-1 can generate a barcode or QR code. Container 106 can scan the barcode or QR code in order to grant waste producer 112 access to container 106. Once waste producer 112 accesses container 106, it can interact with sensor unit 104. For example, waste producer 112 can deposit waste into container 106 and on top of sensor unit 104. In one embodiment, each time the scale (within sensor unit 104) detects a weight change, sensor unit 104 can send a message indicating the weight change to computing device 110-1.

The message sent from sensor unit 104 to computing device 110-1 can include user identification information and the amount of weight detected by the scale within sensor unit 104. Computing device 110-1 can confirm that it has already registered with sensor unit 104 by verifying the user identification information in the message. Computing device 110-1 can alert waste producer 112 that the message has been received by displaying a notification. In another embodiment, computing device 110-1 can update and display statistics based on information in the message. For example, the statistics can include the types(s) of compost weighed, the average weight of each compost type, a total weight, an average frequency of compost collection, and a total number of compost collections. The statistics can also contain the location of container 106 and its associated sensor unit 104 as well as the user profile associated with waste producer 112. This may be desirable in a scenario where container 106 and its associated sensor unit 104 are located in a public space.

Computing devices 110-1 and 110-2 can be in electronic communication with a server 102 via a network. The network can be the same network as the one facilitating the communication between computing devices 110-1 and 110-2 and sensor unit 104. In another embodiment, computing devices 110-1 and 110-2 can communicate with server 102 via a separate network. In one embodiment, computing devices 110-1 and 110-2 can transmit the created user profile to server 102 for storage. As stated above, the user profile can include information, such as the user's name, contact information, and address. The user profile can also indicate whether the user is a waste producer 112 or a waste producer 114, and store characteristics associated with each designation. Storing the user profile at server 102 can be beneficial so that a user can access their user profile from any device that can connect to server 102.

Server 102 can be any combination of hardware and/or software capable of electronically communicating over a network. Server 102 can be implemented on a server computer, virtual machine, containerized application, cloud-computing platform, or other devices as would be appreciated by a POSA. Server 102 can also be implemented on a desktop computer, laptop, tablet, smartphone, or other device as would be appreciated by a POSA. Server 102 can be a single physical component or can be multiple components working together. In one embodiment, server 102 can communicate electronically over a network. The network can be wired, wireless, or a combination thereof. The network can include any combination of local area networks, wide area networks, the internet, or any other suitable network as would be appreciated by a POSA. Server 102 can also be in electronic communication with waste collector 114.

Waste collector 114 can be any party that collects waste. Waste collector 114 can be a person, a business, or any other entity as would be appreciated by a POSA. Waste collector 114 can collect waste for any purpose, such as for personal use or for business purposes. Waste collector 114 can specialize in collecting certain types of waste. In one embodiment, waste collector 114 can specialize in collecting compost. Although one waste collector 114 is illustrated in FIG. 1, the disclosure is not limited by that embodiment. In one embodiment, waste collector 114 can access computing device 110-2 that is in electronic communication with server 102.

In one embodiment, computing device 110-1 can initiate a matching algorithm. The matching algorithm can be performed on server 102, computing device 110-1, computing device 110-2, or any combination thereof. The matching algorithm can be configured to match one or more waste producers 112 with one or more waste collectors 114 to transfer collected waste from waste producer 112 to waste collector 114. Server 102 can use information from user profiles associated with one or more waste producers 112 and one or more waste collectors 114 in the matching algorithm. For example, if waste producer 112 initiates the matching algorithm, server 102 can determine potential matches by searching for users that are designated as waste collectors 114 within their user profiles. In another embodiment, server 102 can request updated information from one or more waste producers 112 and/or one or more waste collectors 114 before executing the matching algorithm. For example, if waste collector 114 did not specify a location from where it can collect compost, server 102 can request that waste collector 114 update its user profile to include a location. In another embodiment, if waste producer 112 has not specified a type of compost, server 102 can request that waste producer 112 update its user profile to include this information.

The matching algorithm can rank waste collectors 114 based on the overlap of their characteristics with characteristics of waste producer 112. For example, waste producer 112 can enter into its user profile that it is located in Baltimore City, MD, it produces vegetable scraps as compost, and it needs compost collected every Friday. When waste producer 112 initiates the matching algorithm, server 102 can search for waste collectors 114 with user profiles indicating that they can collect compost from Baltimore City, MD. For example, server 102 may find a first waste collector 114 and a second waste collector 114 that can pick up compost in Baltimore City, MD. However, if the first waste collector 114 can only collect compost once a month whereas the second waste collector 114 can collect compost every Friday, server 102 will rank the second waste collector 114 ahead of the first waste collector 114.

In one embodiment, the matching algorithm can sort waste collectors 114 by comparing each characteristic of each waste collector 114 with each characteristic of waste producer 112. Waste collectors 114 with more similarity across more characteristics with waste producer 112 can be ranked higher than waste collectors 114 with less similarity. In some embodiments, there can be no overlap or similarity between waste producer 112 and any waste collectors 114. In this instance, waste producer 112 can be prompted to update or change their characteristics. For example, if waste producer 112 indicates a pickup location as Baltimore City, MD, but server 102 cannot locate any waste collector 114 user profiles indicating a location and corresponding radius intersecting Baltimore City, MD, server 102 can prompt waste producer 112 that there are no available waste collectors 114. In this scenario, waste producer 112 can update their pickup location in an attempt to match with one or more waste collectors 114

In some embodiments, characteristics of waste collector 114 can determine whether it will be included in the matching algorithm initiated by waste producer 112. In one embodiment, if waste producer 112 needs compost collected from a location that is outside the radius defined in waste collector 114's user profile, waste collector 114 will not be included in the matching algorithm. For example, if waste producer 112 is located in Washington, DC, and waste collector 114 is located in Los Angeles, CA with a pickup radius of 3 miles, waste collector 114 will not be included in the matching algorithm. In another embodiment, waste collector 114 can be excluded from the matching algorithm if the type of compost held by waste producer 112 does not match the type included in waste collector 114's user profile. For example, if waste producer 112's user profile indicates it produces vegetable scraps as compost, but waste collector 114's user profile states it only collects wood chips, waste collector 114 will not be a potential match for waste producer 112.

In another embodiment, waste producer 112 can assign priorities to certain characteristics to maximize its similarity compared to the remaining characteristics. For example, waste producer 112 can desire to have its compost collected every day and assign a priority to the characteristic associated with collection frequency. The matching algorithm can respond by only including waste collectors 114 that collect compost every day. In another embodiment, waste producer 112 located in Baltimore City, MD can assign priorities to having its compost collected every day and needs 10 pounds of compost collected each day. The matching algorithm may find a first waste collector 114 that is located in Baltimore City, MD and can collect the 10 pounds of compost, but is only available for collection once a week. There may be a second waste collector 114, located in Washington, DC that can collect the 10 pounds of compost every day. In this scenario, although the first waste collector 114 is closer in distance to waste producer 112, the matching algorithm would rank the second waste collector 114 ahead of the first waste collector 114 based on matching the prioritized characteristics.

The result of the matching algorithm can be transmitted from server 102 to computing device 110-1 of waste producer 112. The result can include a list of waste one or more collectors 114. One or more waste collectors 114 can be notified that they have been matched to waste producer 112. Waste producer 112 can select one or more waste collectors 114 from the result list and send them pre-defined messages via the software application on computing device 110-1. In one embodiment, the pre-defined messages can be designed to facilitate the collection of the compost. The pre-defined messages can include waste producer 112's contact information, such as their phone number and/or email address. The pre-defined messages can also contain characteristics of waste producer 112, such as its location, the type of compost, the amount of compost, and pickup frequency. In another embodiment, waste producer 112 can send one or more waste collectors 114 custom messages to organize the collection of the compost. For example, waste producer 112 can send a custom message to waste collector 114 to propose a pickup time. In another embodiment, waste producer 112 can send a custom message to waste collector 114 the day before a scheduled pickup to confirm that waste collector 114 is still available to collect the compost. One or more waste collectors 114 can respond to waste producer 112's message via the software application on computing device 110-2.

Waste producer 112 can have the option of cancelling the matching algorithm once it has been initiated. This can be accomplished by sending a message from computing device 110-1 to server 102. Waste collector 114 can opt in or out of the matching algorithm via the software application on computing device 110-2. If waste collector 114 opts in, it can be selected by the matching algorithm. If waste collector 114 opts out, it cannot be selected by the matching algorithm initiated by waste producer 112.

Waste producer 112 and waste collector 114 can verify that waste collector 114 collected the waste from waste producer 112. In one embodiment, waste producer 112 and waste collector 114 can take photographs of the collected waste and submit them via the software application on computing devices 110-1 and 110-2 to server 102. Upon receiving verification that the waste has been collected, server 102 can allocate points to the user profile associated with waste producer 112. The amount of points allocated can vary. In one embodiment, waste producer 112 can be given one point per pound of compost collected.

The points can act as an incentive for waste producers 112 to continue composting. In one embodiment, the points can be redeemed for rewards. For example, a company that manufactures and/or sells compostable bags can offer a discount on the bags in exchange for points from waste producer 112.

Figure 2:
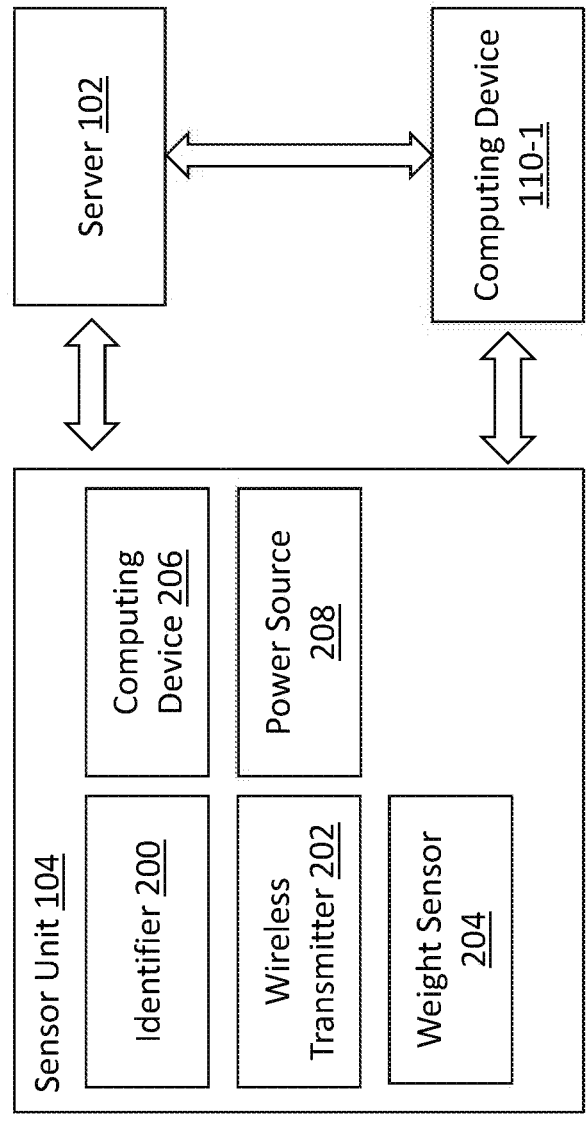
FIG. 2 is a block diagram of a sensor unit and a server, according to some aspects of the present disclosure.

FIG. 2 is a block diagram illustrating components of sensor unit 104 in relation to other parts of system 100. Sensor unit 104 can include an identifier 200, a wireless transmitter 202, a weight sensor 204, a computing device 206, and a power source 208. Based on the description herein, a POSA would understand that sensor unit 104 can include other components.

Identifier 200 can be used to link waste producer 112 with sensor unit 104. For example, identifier 200 can be a QR code or barcode that is printed on sensor unit 104. In another embodiment, identifier 200 can be a radio frequency identification (RFID) tag. Identifier 200 can be defined at the time of manufacture. In another embodiment, waste producer 112 can create identifier 200 and assign it to sensor unit 104 via a software application on computing device 110-1. In an additional embodiment, waste producer 112 can edit and/or delete identifier 200. Identifier 200 can be unique such that no other sensor unit 104 has the same identifier 200. The software application on computing device 110-1 can input and store identifier 200. In an embodiment, where identifier 200 is a QR code or a barcode, a camera on computing device 110-1 can be used to read identifier 200 for processing by the software application.

Wireless transmitter 202 can be any combination of software and hardware to enable sensor unit 104 to communicate over a network. For example, wireless transmitter 202 can be a radio transmitter. Wireless transmitter 202 can be capable of placing sensor unit 104 in electronic communication with server 102 and computing device 110-1.

Weight sensor 204 can be a transducer device capable of converting mechanical load into an electrical signal. The output of weight sensor 204 can correspond to the weight of an object placed on sensor unit 104.

Computing device 206 can be in electronic communication with wireless transmitter 202 and weight sensor 204. In one embodiment, computing device 206 can read a weight measurement from weight sensor 204 and send it to wireless transmitter 202. Computing device 206 can also read identifier 200 and send it (along with the weight measurement from weight sensor 204) to wireless transmitter 202 for transmission.

Power source 208 can be a power outlet providing AC voltage via a plug and wire connectable to sensor unit 104. In another embodiment, power source 208 can be incorporated into sensor unit 104. For example, power source 208 can be a single use or rechargeable battery positioned within sensor unit 104.

Figure 3:
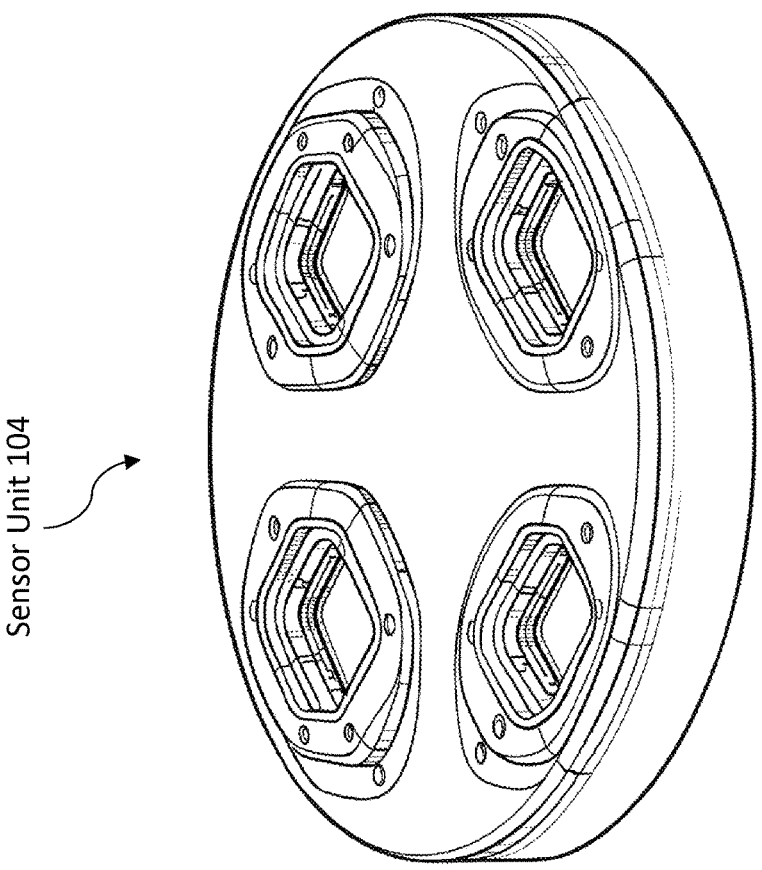
FIG. 3 is an illustration of a sensor unit, according to some aspects of the present disclosure.

FIG. 3 is an illustration of sensor unit 104, according to some embodiments. In one embodiment, sensor unit 104 can be cylindrical in shape, having a flat surface. Sensor unit 104 can be made of plastic, metal, or any other suitable material as would be appreciated by a POSA. Sensor unit 104 can be waterproof. For example, if sensor unit 104 is constructed from multiple components, o-rings or a waterproof adhesive can be placed at one or more junctures of the component to form watertight seals. In another embodiment, sensor unit 104 can be cast into a single component from a waterproof material, such as plastic.

Figure 4:
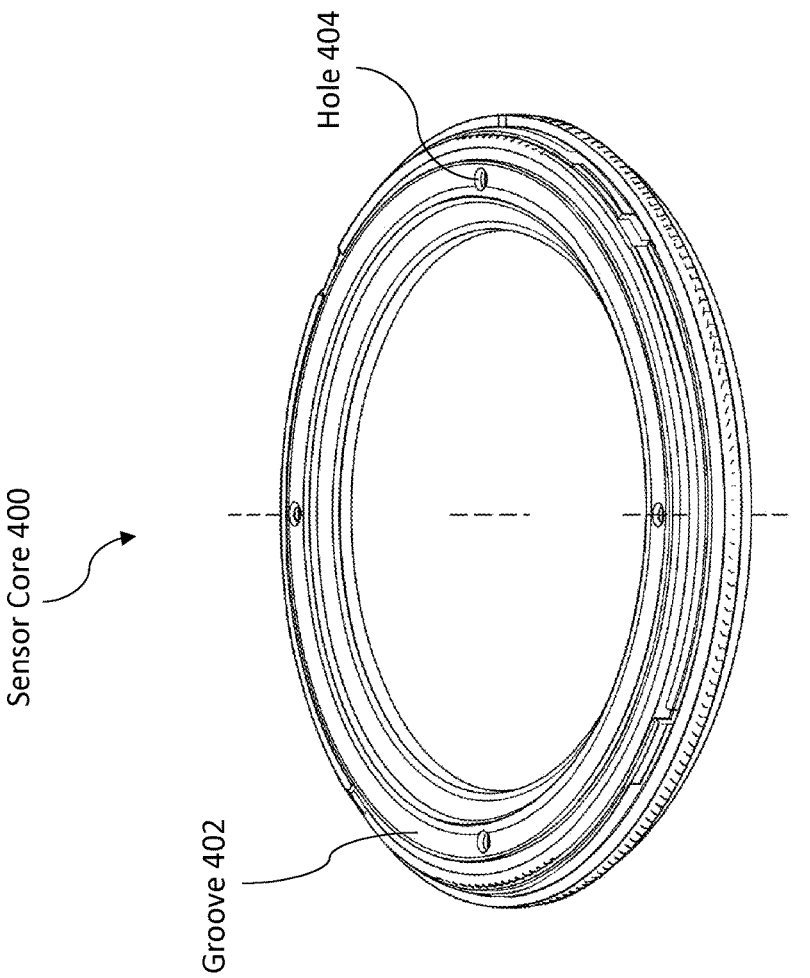
FIG. 4 is an illustration of a sensor core, according to some aspects of the present disclosure.

FIG. 4 is an illustration of a sensor core 400, according to some embodiments. Sensor core 400 can be connected to sensor unit 104. In one embodiment, sensor unit 104 can be placed on top of sensor core 400. Sensor unit 104 can connect to sensor core 400 via any means of connection. For example, sensor core 400 and sensor unit 104 can have matching sets of holes so that fasteners (e.g., screws), can be used to join sensor core 400 and sensor unit 104. In an embodiment, sensor core 400 can have a circular groove 402 disposed on a top side of sensor core 400. The groove 402 can have an inner diameter. In an embodiment, holes 404 are can be disposed in the groove 402. There can be any number of holes 404. In a particular embodiment, four boles 404 are present. In an embodiment, the holes 404 are disposed through the thickness of sensor core 400 and connect the top side with a bottom side. In an embodiment, the holes 404 are not disposed through the thickness of the sensor core 400 and do not connect the top side with the bottom side.

Figure 5:
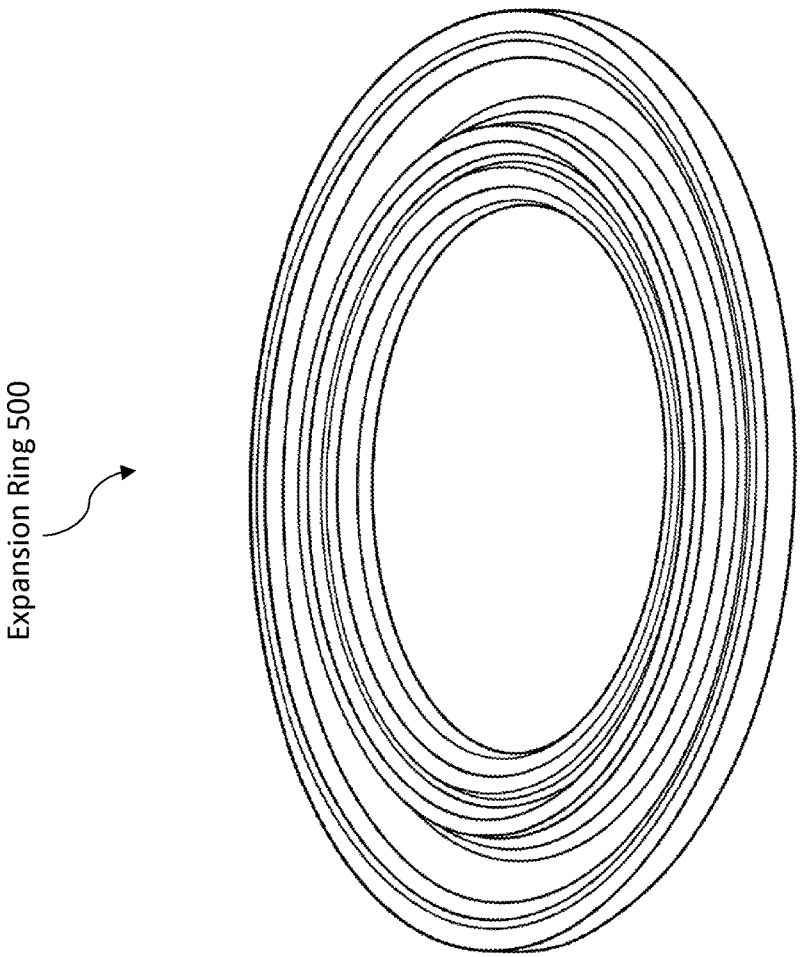
FIG. 5 is an illustration of an expansion ring, according to some aspects of the present disclosure.

FIG. 5 is an illustration of an expansion ring 500, according to some embodiments. Expansion ring 500 can be mated with sensor core 400. Expansion ring 500 can have the same width and inner diameter as sensor core 400. Expansion ring 500 can have a ridge that mates with groove 402 of sensor core 400. In another embodiment, expansion ring 500 can have holes that match with the holes 404 of sensor core 400. In that embodiment, screws or pegs can be inserted into the holes to attach expansion ring 500 to sensor core 400. Expansion ring 500 can be used to increase the surface area of sensor unit 104. In one embodiment, sensor unit 104 can be placed in container 106 such that sensor unit 104 does not occupy the entire surface area of the bottom of container 106. Expansion ring 500 can be added to sensor unit 104 to expand its surface area to occupy the entirety of the bottom of container 106. Occupying the entirety of the bottom of container 106 can be desirable so that the scale within sensor unit 104 can accurately record the weight of an object placed on sensor unit 104. Expansion ring 500 can be made in various sizes to fit different sized containers 106. In one embodiment, expansion ring 500 can be telescoping, allowing it to expand and shrink to fit inside different sized containers 106.

FIG. 6 is a flowchart for a method 600 for facilitating the collection of compost from compost producers by compost collectors, according to an aspect of the present disclosure. It is to be appreciated that not all operations can be needed to perform the disclosure provided herein. Further, some of the operations can be performed simultaneously, or in a different order than shown in FIG. 6, as will be understood by a POSA.

Method 600 can be implemented by server 102 and operations caused by computing devices 110-1 and/or 110-2. However, method 600 is not limited to this example system.

In 602, computing devices 110-1 and/or 110-2 can receive a message from sensor unit 104. The message can include the weight of an object placed on sensor unit 104 and user identification information. In another embodiment, the message can include the type of object placed on sensor unit 104. For example, the message can notify the users associated with computing devices 110-1 and/or 110-2 that the object is a type of compost. Sensor unit 104 can send messages to computing devices 110-1 and/or 110-2 at various frequencies. In one embodiment, sensor unit 104 can send a message each time it detects a weight change. In another embodiment, sensor unit 104 can send the message at a set interval, such as once every hour, once every day, and once a week. Computing devices 110-1 and/or 110-2 can update statistics for the user associated with the user identification information based on the message received. For example, statistics associated with total waste collected can be updated based on the weight of the object in the received message.

In 604, computing devices 110-1 and/or 110-2 can initiate a matching algorithm. In one embodiment, the matching algorithm is initiated by sending a message from computing devices 110-1 and/or 110-2 to server 102. The message can include the weight of the object placed on sensor unit 104 and the user identification information. In another embodiment, the message can also include the type of the object, such as compostable waste. Users associated with computing devices 110-1 and/or 110-2 can transmit the message to initiate the matching algorithm. In one embodiment, server 102 can send an acknowledgment message to computing devices 110-1 and/or 110-2 that it has initiated the matching algorithm. Server 102 can also update statistics associated with the users of computing devices 110-1 and/or 110-2 based on the message content. For example, server 102 can update the total weight of collected compost from a user based on the message content.

In 606, computing devices 110-1 and/or 110-2 can receive the results of the matching algorithm. In one embodiment, the results can be received in the form of a message from server 102. The results can include a list of one or more waste collectors 114 that are candidates to collect the waste generated by waste producer 112. The list of one or more waste collectors 114 can be ranked based on the amount of similarity between characteristics associated with waste producer 112 and waste collectors 114. The characteristics can include the type of compost, an amount of compost, the physical location of the compost, a collection time, and a frequency of compost collection. The degree of similarity between the first and second characteristics can be determined by comparing the value of each of the respective characteristics. In one embodiment, an average similarity can be computed from the comparison of each characteristic. The average similarity values can be used to order the list of waste collector 114's. In one embodiment, a binary value can be assigned to the result of each characteristic comparison. A "1" can be assigned if the characteristics match, and a "0" can be assigned if they do not. In one embodiment, waste producer 112 produces vegetable scraps and needs its compost collected once a week. Additionally, waste collector 114 may collect vegetable scraps as a type of compost but may only be available for collection once a month. Comparing the two characteristics, the parties would have a 50% degree of similarity because they matched with respect to the type of compost but not collection frequency. In the event of a tie between two or more waste collectors 114, the matching algorithm can use the physical distance between waste producer 112 and each waste collector 114 to break the tie. For example, there may be a first waste collector 114 located in Washington, DC with a pickup radius of 100 miles, a second waste collector 114 located in Baltimore City, MD with a pickup radius of 10 miles, and a waste producer 112 located in Baltimore City, MD. If both waste collector 114's are tied with respect to their remaining characteristics, the second waste collector 114 would be ranked ahead of the first because of the closer geographic distance to waste producer 112.

In one embodiment, the ranking can be altered if priorities are assigned to characteristics. For example, a priority can be assigned to the frequency of compost collection. The matching algorithm can respond by only including waste collectors 114 that are able to collect at the specified frequency.

FIG. 7 is a flowchart for a method 700 for facilitating the collection of compost from compost producers by compost collectors, according to an aspect of the present disclosure. It is to be appreciated that not all operations can be needed to perform the disclosure provided herein. Further, some of the operations can be performed simultaneously, or in a different order than shown in FIG. 7, as will be understood by a POSA.

Method 700 can be implemented by server 102 and operations caused by computing devices 110-1 and/or 110-2. However, method 700 is not limited to that example system.

In 702, characteristics associated with waste producer 112 can be retrieved. The characteristics can be stored on server 102 or be transmitted with the request to initiate the matching algorithm. The characteristics can be stored as part of a user profile associated with waste producer 112. The characteristics can include the type of compost, an amount of compost, the physical location of the compost, a collection time, and a frequency of compost collection.

In 704, a list of other user identifications and their respective characteristics can be retrieved. The other user identifications can correspond to one or more waste collectors 114. The other user identifications and their respective characteristics can be stored at server 102. The characteristics associated with waste collectors 114 can be stored as part of their user profiles. Characteristics associated with waste collectors 114 can include the type of compost they wish to collect, the amount of compost they are able to collect, the frequency they would like to collect compost, and a location with a corresponding radius defining the region they will collect compost from In 706, characteristics of waste producer 112 can be compared to the characteristics of each waste collector 114. The retrieved list of waste collectors 114 can be ranked based on the similarity between each characteristic of waste collectors 114 and waste producer 112. For example, if the characteristics between waste producer 112 and a waste collector 114 are exactly the same, that waste collector 114 can be first in the list. The degree of similarity between the first and second characteristics can be determined by comparing the value of each of the respective characteristics. In one embodiment, an average similarity can be computed from the comparison of each characteristic. The average similarity values can be used to order the list of one or more waste collectors 114.

Figure 8:
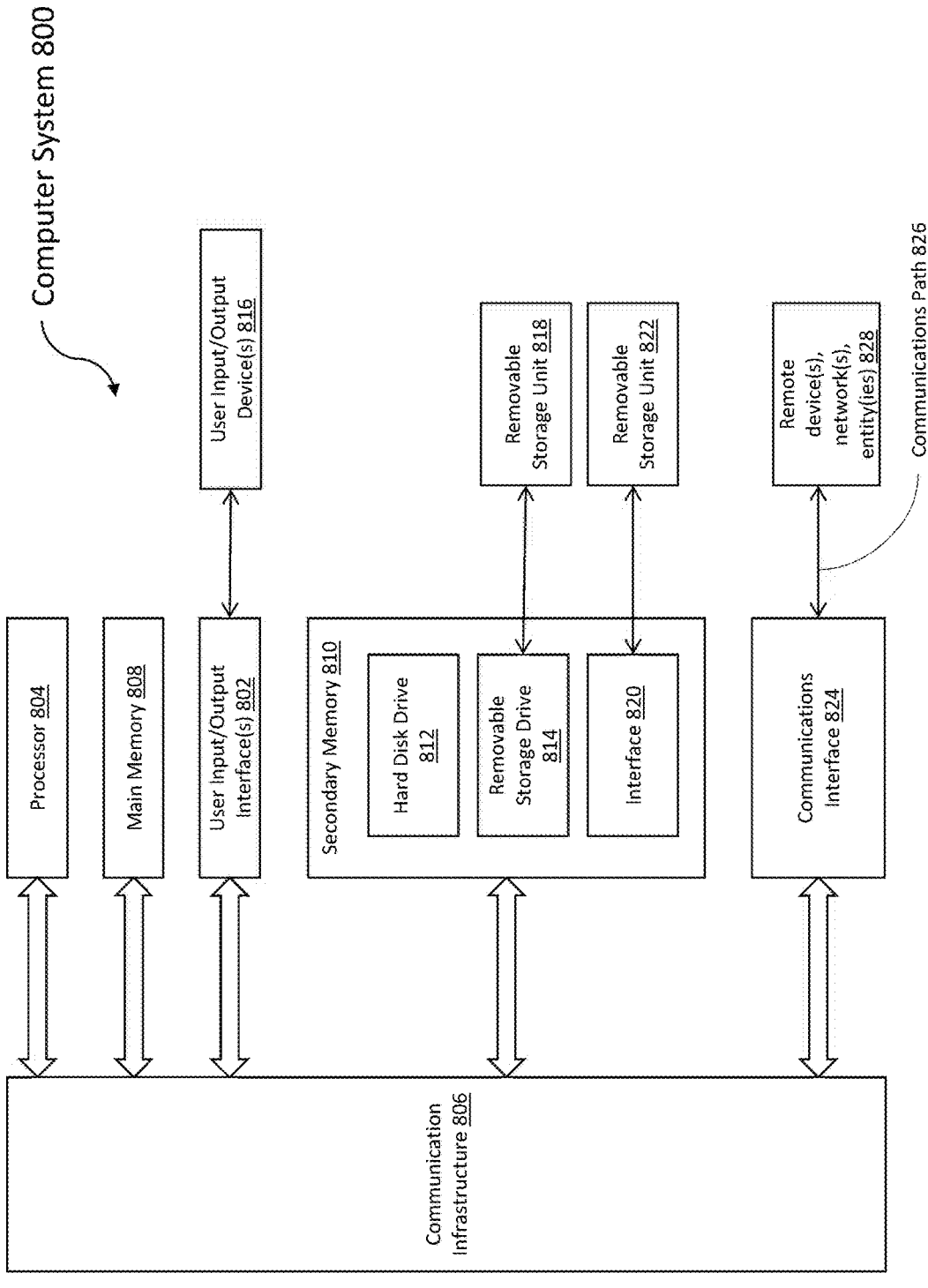
FIG. 8 is a block diagram of an example computer system for implementing various aspects of the present disclosure.

Various aspects can be implemented, for example, using one or more computer systems, such as computer system 800 shown in FIG. 8. Computer system 800 can be used, for example, to implement a system of facilitating the collection of compost from compost producers by compost collectors. For example, computer system 800 can facilitate the collection of compost from compost producers by compost collectors, Computer system 800 can be any computer capable of performing the functions described herein.

Computer system 800 can be any well-known computer capable of performing the functions described herein-such as the operations in method 700 of FIG. 7 and method 800 of FIG. 8.

Computer system 800 includes one or more processors (also called central processing units, or CPUs), such as a processor 804. Processor 804 is connected to a communication infrastructure or bus 806.

One or more processors 804 can each be a graphics processing unit (GPU). In an aspect, a GPU is a processor that is a specialized electronic circuit designed to process mathematically intensive applications. The GPU can have a parallel structure that is efficient for parallel processing of large blocks of data, such as mathematically intensive data common to computer graphics applications, images, videos, etc.

Computer system 800 also includes user input/output device(s) 816, such as monitors, keyboards, pointing devices, etc., that communicate with communication infrastructure 806 through user input/output interface(s) 802.

Computer system 800 also includes a main or primary memory 808, such as random access memory (RAM). Main memory 808 can include one or more levels of cache. Main memory 808 has stored therein control logic (e.g., computer software) and/or data.

Computer system 800 can also include one or more secondary storage devices or memory 810. Secondary memory 810 can include, for example, a hard disk drive 812 and/or a removable storage device or drive 814. Removable storage drive 814 can be a floppy disk drive, a magnetic tape drive, a compact disk drive, an optical storage device, tape backup device, and/or any other storage device/drive.

Removable storage drive 814 can interact with a removable storage unit 818. Removable storage unit 818 includes a computer usable or readable storage device having stored thereon computer software (control logic) and/or data. Removable storage unit 818 can be a floppy disk, magnetic tape, compact disk, DVD, optical storage disk, and/any other computer data storage device. Removable storage drive 814 reads from and/or writes to removable storage unit 818 in a well-known manner.

According to an exemplary aspect, secondary memory 810 can include other means, instrumentalities or other approaches for allowing computer programs and/or other instructions and/or data to be accessed by computer system 800. Such means, instrumentalities or other approaches can include, for example, a removable storage unit 822 and an interface 820. Examples of the removable storage unit 822 and the interface 820 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 800 can further include a communication or network interface 824. Communication interface 824 enables computer system 800 to communicate and interact with any combination of remote devices, remote networks, remote entities, etc. (individually and collectively referenced by reference number 828). For example, communication interface 824 can allow computer system 800 to communicate with remote devices 828 over communications path 826, which can be wired and/or wireless, and which can include any combination of LANs, WANs, the Internet, etc. Control logic and/or data can be transmitted to and from computer system 800 via communication path 826.

In an aspect, a tangible, non-transitory apparatus or article of manufacture including a tangible, non-transitory computer useable or readable medium having control logic (software) stored thereon is also referred to herein as a computer program product or program storage device. This includes, but is not limited to, computer system 800, main memory 808, secondary memory 810, and removable storage units 818 and 822, as well as tangible articles of manufacture embodying any combination of the foregoing. Such control logic, when executed by one or more data processing devices (such as computer system 800), causes such data processing devices to operate as described herein.

Based on the teachings in this disclosure, it will be apparent to persons skilled in the relevant art(s) how to make and use aspects of this disclosure using data processing devices, computer systems and/or computer architectures other than that shown in FIG. 8. In particular, aspects can operate with software, hardware, and/or operating system implementations other than those described herein.

It is to be appreciated that the Detailed Description section, and not any other section, is intended to be used to interpret the claims. Other sections can set forth one or more but not all exemplary aspects as contemplated by the inventor(s), and thus, are not intended to limit this disclosure or the appended claims in any way.

While this disclosure describes exemplary aspects for exemplary fields and applications, it should be understood that the disclosure is not limited thereto. Other aspects and modifications thereto are possible, and are within the scope and spirit of this disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative aspects can perform functional blocks, steps, operations, methods, etc. using orderings different than those described herein.

References herein to "one aspect," "an aspect," "an example aspect," or similar phrases, indicate that the aspect described can include a particular feature, structure, or characteristic, but every aspect can not necessarily include the particular feature, structure, or characteristic. Moreover, such phrases are not necessarily referring to the same aspect. Further, when a particular feature, structure, or characteristic is described in connection with an aspect, it would be within the knowledge of persons skilled in the relevant art(s) to incorporate such feature, structure, or characteristic into other aspects whether or not explicitly mentioned or described herein. Additionally, some aspects can be described using the expression "coupled" and "connected" along with their derivatives. These terms are not necessarily intended as synonyms for each other. For example, some aspects can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary aspects, but should be defined only in accordance with the following claims and their equivalents.

What is claimed is:

1. A device, comprising:
a sensor configured to determine a weight of an object and to store a user identification; and
a computing device configured to:
receive the weight of the object and the user identification from the sensor;
retrieve first characteristics corresponding to the user identification;
retrieve a list of other user identifications, wherein each of the other user identifications comprises respective second characteristics; and
order the list of other user identifications based on a degree of similarity between first characteristics of the user identification and second characteristics of each of the other user identifications; and
receive a result from a matching algorithm, wherein the result comprises the list of other user identifications ranked in order such that the first other user identification in the list has characteristics that are most similar to the characteristics of the user identification.

2. The device of claim 1, wherein the object comprises compost.

3. The device of claim 1, wherein the first and second characteristics comprise a type of compost, an amount of compost, a physical location, a time, and a frequency of compost collection.

4. The device of claim 1, wherein at least one of the first and second characteristics is assigned a priority to maximize the degree of similarity between the prioritized first and second characteristic compared to the remaining first and second characteristics.

5. The device of claim 1, wherein the computing device is further configured to calculate and display statistics over a predetermined time interval, wherein the statistics comprise one or more compost types, an average weight of each compost type, a total weight, an average frequency of compost collection, and a total number of compost collections.

6. The device of claim 1, wherein the computing device is further configured to allocate points to the user identification based on the weight of the object.

7. The device of claim 1, wherein the computing device is further configured to send messages through a first computing device associated with the user identification to other computing devices associated with the other user identifications based on the result from the matching algorithm, wherein one or more messages comprise a request to collect compost from a user associated with the user identification by at least one user associated with the other user identifications.

8. The device of claim 1, wherein the computing device is further configured to add or delete user identifications.

9. The device of claim 1, wherein the user identification and the other user identifications are assigned to one or more categories, wherein the one or more categories comprise producers and collectors.

10. A method, comprising:
receiving, from a sensor, a weight of an object and a user identification;
initiating a matching algorithm based on the weight and the user identification, wherein the matching algorithm comprises:
retrieving first characteristics corresponding to the user identification;
retrieving a list of other user identifications, wherein each of the other user identifications comprises second characteristics; and
ordering the list of other user identifications based on a degree of similarity between first characteristics of the user identification and second characteristics of each of the other user identifications; and
receiving a result of the matching algorithm, wherein the result comprises the list of other user identifications ranked in order such that the first other user identification in the list has characteristics that are most similar to the characteristics of the user identification,
wherein the receiving, initiating, and receiving are performed by at least one processor.

11. The method of claim 10, wherein receiving the weight of the object comprises receiving the weight of compost.

12. The method of claim 10, wherein the first and second characteristics comprise a type of compost, an amount of compost, a physical location, a time, and a frequency of compost collection.

13. The method of claim 10, wherein the matching algorithm further comprises assigning at least one of the first and second characteristics a priority to maximize the similarity between the prioritized first and second characteristics compared to the remaining first and second characteristics.

14. The method of claim 10, further comprising sending messages through a first computing device associated with the user identification to other computing devices associated with the other user identifications based on the result of the matching algorithm, wherein one or more messages comprise a request to collect compost from a user associated with the user identification by at least one user associated with the other user identifications.

15. The method of claim 10, further comprising categorizing the user identification as a producer and the other user identifications as collectors.

16. A system, comprising:
a container, comprising:
a surface;
at least one wall extending perpendicular to the surface; and
a sensor positioned on the surface, wherein the sensor is configured to determine a weight of an object placed on the sensor and to store a user identification; and
a computing device configured to:
receive the weight of the object and the user identification from the sensor;
initiate a matching algorithm based on the weight value, wherein the matching algorithm is configured to:
retrieve first characteristics corresponding to the user identification;
retrieve a list of other user identifications wherein each of the other user identifications comprises second characteristics; and

order the list of other user identifications based on a degree of similarity between first characteristics of the user identification and second characteristics of each of the other user identification;
receive a result from the matching algorithm, wherein the result comprises the list of other user identifications ranked in order such that the first other user identification in the list has characteristics that are most similar to the characteristics of the user identification; and
send a message to at least one of the other user identifications, wherein the message comprises a request to collect the object.

17. The system of claim 16, wherein the object comprises compost.

18. The system of claim 16, wherein the first and second characteristics comprise a type of compost, an amount of compost, a physical location, a time, and a frequency of compost collection and at least one of the first and second characteristics is assigned a priority to maximize the degree of similarity between the prioritized first and second characteristic compared to the remaining first and second characteristics.

19. The system of claim 16, further comprising an additional sensor positioned on at least one wall of the container, wherein:
the position of the additional sensor corresponds to a volume of the container;
the additional sensor is configured to send an alert to the computing device in response to detecting the object; and
the alert comprises the volume corresponding to the position of the additional sensor.

20. The system of claim 16, wherein the container further comprises a camera positioned to face an interior of the container, wherein the camera is configured to generate a photograph of the interior, record a video of the interior, identify the object, generate a label of the object, send the photograph, video, and the generated label to the computing device.

* * * * *